United States Patent
Hewitt et al.

(10) Patent No.: US 11,567,630 B2
(45) Date of Patent: *Jan. 31, 2023

(54) CALIBRATION OF A MACHINE LEARNING CONFIDENCE SCORE

(71) Applicant: Bottomline Technologies, Inc., Portsmouth, NH (US)

(72) Inventors: Jonathan Hewitt, Exeter, NH (US); Flora Kidani, Wilton, CT (US); Anne Baron, Ansonia, CT (US); John Canneto, Rye, NY (US); William Cashman, Durham, NH (US); Michael Marcinelli, North Andover, MA (US)

(73) Assignee: Bottomline Technologies, Inc., Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/744,170

(22) Filed: May 13, 2022

(65) Prior Publication Data
US 2022/0269395 A1   Aug. 25, 2022

Related U.S. Application Data

(63) Continuation of application No. 17/328,387, filed on May 24, 2021, now Pat. No. 11,354,018, which is a
(Continued)

(51) Int. Cl.
G06F 3/04817     (2022.01)
G06N 20/00        (2019.01)
(Continued)

(52) U.S. Cl.
CPC ........ *G06F 3/04817* (2013.01); *G06F 3/0482* (2013.01); *G06F 40/205* (2020.01); *G06N 20/00* (2019.01)

(58) Field of Classification Search
CPC .................. G06F 3/048–05; G06N 20/00
See application file for complete search history.

(56) References Cited

U.S. PATENT DOCUMENTS

| D57,838 S | 5/1921 | Jacob |
| 4,502,788 A | 3/1985 | Lowden |
| (Continued) | | |

FOREIGN PATENT DOCUMENTS

| CN | 104809171 A | 7/2015 |
| DM | 086083 | 2/2015 |
| (Continued) | | |

OTHER PUBLICATIONS

Bedtime Bulb logo by Kassymkulov Design on Dribbble, https://dribbble.com/shots/5851134-Bedtime-Bulb-logo.
(Continued)

*Primary Examiner* — Daniel Rodriguez
(74) *Attorney, Agent, or Firm* — Richard A. Baker, Jr.

(57) ABSTRACT

A unique user interface for improving machine learning algorithms is described herein. The user interface comprises an icon with multiple visual indicators displaying the machine learning confidence score. When a mouse hovers over the icon, a set of icons are displayed to accept the teaching user's input. In addition, the words that drove the machine learning confidence score are highlighted with formatting so that the teaching user can understand what drove the machine learning confidence score.

17 Claims, 6 Drawing Sheets

Related U.S. Application Data continuation of application No. 16/919,580, filed on Jul. 2, 2020, now Pat. No. 11,029,814, which is a continuation of application No. 16/299,227, filed on Mar. 12, 2019, now Pat. No. 10,732,789.

(51) Int. Cl.
*G06F 3/0482* (2013.01)
*G06F 40/205* (2020.01)

(56) References Cited

U.S. PATENT DOCUMENTS

| | | |
|---|---|---|
| 5,182,705 A | 1/1993 | Barr et al. |
| 5,287,270 A | 2/1994 | Hardy et al. |
| 5,329,447 A | 7/1994 | Leedom, Jr. |
| 5,359,508 A | 10/1994 | Rossides |
| 5,473,630 A | 12/1995 | Penzias et al. |
| 5,481,741 A | 1/1996 | McKaskle et al. |
| 5,557,515 A | 9/1996 | Abbruzzese et al. |
| 5,583,778 A | 12/1996 | Wind |
| 5,633,919 A | 5/1997 | Hogan et al. |
| 5,634,012 A | 5/1997 | Stefik et al. |
| 5,649,013 A | 7/1997 | Stuckey et al. |
| 5,710,887 A | 1/1998 | Chelliah et al. |
| 5,774,866 A | 6/1998 | Horwitz et al. |
| D397,104 S | 8/1998 | Boots |
| 5,790,664 A | 8/1998 | Coley et al. |
| 5,805,159 A | 9/1998 | Bertram et al. |
| 5,819,092 A | 10/1998 | Ferguson et al. |
| 5,827,070 A | 10/1998 | Kershaw et al. |
| 5,875,431 A | 2/1999 | Heckman et al. |
| D439,912 S | 4/2001 | Flamini |
| 6,622,128 B1 | 9/2003 | Bedell et al. |
| 6,882,986 B1 | 4/2005 | Heinemann et al. |
| 6,885,986 B1 | 4/2005 | Heinemann et al. |
| 6,934,691 B1 | 8/2005 | Simpson et al. |
| D577,745 S | 9/2008 | Bruzelius |
| 7,809,615 B2 | 10/2010 | Hui et al. |
| 7,958,023 B1 | 6/2011 | Shibayama |
| D660,314 S | 5/2012 | Gosejacob et al. |
| D706,283 S | 6/2014 | Pedraza et al. |
| 8,744,934 B1 | 6/2014 | McCrea |
| 8,898,595 B2 | 11/2014 | Cragun |
| D749,092 S | 2/2016 | Lee et al. |
| D751,089 S | 3/2016 | Kaufthal |
| 9,384,264 B1 | 7/2016 | Kavas |
| D771,684 S | 11/2016 | Kim |
| D772,296 S | 11/2016 | Vulk et al. |
| D794,647 S | 8/2017 | Cronin et al. |
| D794,669 S | 8/2017 | Baker et al. |
| D800,160 S | 10/2017 | Shaw |
| D816,116 S | 4/2018 | Selassie |
| D817,993 S | 5/2018 | Coffman et al. |
| 9,983,582 B2 | 5/2018 | Nemec et al. |
| D819,671 S | 6/2018 | Rajaraman et al. |
| D823,694 S | 7/2018 | Redin Wyden |
| D829,235 S | 9/2018 | Gangcuangco et al. |
| D830,408 S | 10/2018 | Clediere |
| D830,409 S | 10/2018 | Agarwal et al. |
| D831,696 S | 10/2018 | Clarke et al. |
| D834,594 S | 11/2018 | Anzures et al. |
| 10,133,791 B1 | 11/2018 | Chan |
| D844,015 S | 3/2019 | Meng |
| 10,223,586 B1 | 3/2019 | Leibovitz et al. |
| 10,276,261 B2 | 4/2019 | Von Reden |
| D849,050 S | 5/2019 | Clymer et al. |
| D854,043 S | 7/2019 | Van et al. |
| D857,713 S | 8/2019 | Anzures et al. |
| D859,446 S | 9/2019 | Westerhold et al. |
| D860,219 S | 9/2019 | Rasmussen et al. |
| D861,036 S | 9/2019 | Wan et al. |
| 10,438,264 B1 | 10/2019 | Viswanathan |
| D866,588 S | 11/2019 | Agarwal et al. |
| D870,132 S | 12/2019 | Von et al. |
| D870,133 S | 12/2019 | Deschenes et al. |
| D878,392 S | 3/2020 | Jiang et al. |
| D882,625 S | 4/2020 | Dixit et al. |
| 10,732,789 B1 | 8/2020 | Marcinelli et al. |
| D898,762 S | 10/2020 | Coffman et al. |
| D898,763 S | 10/2020 | Felkins et al. |
| D901,518 S | 11/2020 | Gangcuangco et al. |
| D910,072 S | 2/2021 | Cazamias |
| D916,814 S | 4/2021 | Westerhold et al. |
| D916,846 S | 4/2021 | Liu |
| D916,920 S | 4/2021 | Marcinelli |
| 11,029,814 B1 | 6/2021 | Kidani et al. |
| 11,049,204 B1 | 6/2021 | Calitri |
| 2001/0034675 A1 | 10/2001 | Belford et al. |
| 2002/0002535 A1 | 1/2002 | Kitchen et al. |
| 2002/0052894 A1 | 5/2002 | Bourdoncle et al. |
| 2003/0033226 A1 | 2/2003 | Anderson |
| 2003/0110103 A1 | 6/2003 | Sessek et al. |
| 2003/0195844 A1 | 10/2003 | Hogan |
| 2004/0064389 A1 | 4/2004 | Force et al. |
| 2004/0080532 A1* | 4/2004 | Cragun ............ G06F 16/34 707/E17.093 |
| 2005/0138631 A1 | 6/2005 | Bellotti et al. |
| 2006/0059021 A1* | 3/2006 | Yulman ............ G06Q 10/00 705/4 |
| 2007/0022072 A1 | 1/2007 | Kao et al. |
| 2007/0088641 A1 | 4/2007 | Arron et al. |
| 2007/0214068 A1 | 9/2007 | Tadepalli et al. |
| 2008/0010605 A1 | 1/2008 | Frank |
| 2008/0086413 A1 | 4/2008 | Malloy et al. |
| 2008/0141126 A1 | 6/2008 | Johnson et al. |
| 2008/0255972 A1 | 10/2008 | Ulrich et al. |
| 2008/0282153 A1 | 11/2008 | Kinderberg et al. |
| 2009/0132384 A1* | 5/2009 | Duncan ............ G06F 40/143 707/999.102 |
| 2009/0326989 A1 | 12/2009 | Schmitt et al. |
| 2010/0057725 A1 | 3/2010 | Matsumura |
| 2010/0205525 A1 | 8/2010 | Konrad |
| 2010/0211486 A1 | 8/2010 | Abrashkin et al. |
| 2011/0010278 A1 | 1/2011 | Bulman et al. |
| 2011/0035451 A1 | 2/2011 | Smith et al. |
| 2011/0196768 A1 | 8/2011 | Ulrich et al. |
| 2012/0185401 A1 | 7/2012 | Marusyk |
| 2013/0117167 A1 | 5/2013 | Iyer et al. |
| 2013/0159277 A1 | 6/2013 | Liu et al. |
| 2013/0261821 A1 | 10/2013 | Lu et al. |
| 2014/0189608 A1 | 7/2014 | Shuttleworth et al. |
| 2014/0201296 A1 | 7/2014 | Patfield et al. |
| 2014/0223284 A1 | 8/2014 | Rankin et al. |
| 2014/0253465 A1 | 9/2014 | Hicks et al. |
| 2014/0344126 A1 | 11/2014 | Kapoor |
| 2015/0113388 A1 | 4/2015 | Barrett et al. |
| 2015/0324342 A1 | 11/2015 | Chin et al. |
| 2015/0348551 A1 | 12/2015 | Gruber et al. |
| 2015/0356074 A1 | 12/2015 | Issaev |
| 2015/0356246 A1 | 12/2015 | D'Souza et al. |
| 2015/0370760 A1 | 12/2015 | Tigchelaar |
| 2016/0012044 A1 | 1/2016 | Franceschini et al. |
| 2016/0062618 A1 | 3/2016 | Fagan et al. |
| 2016/0063425 A1 | 3/2016 | Fettig et al. |
| 2016/0140529 A1 | 5/2016 | Shaaban et al. |
| 2016/0314547 A1 | 10/2016 | Carothers et al. |
| 2017/0147186 A1 | 5/2017 | Velusamy et al. |
| 2017/0199803 A1 | 7/2017 | Bagal et al. |
| 2017/0206191 A1 | 7/2017 | Biegert et al. |
| 2017/0278132 A1* | 9/2017 | Dennett ............ G06Q 30/0605 |
| 2017/0293951 A1* | 10/2017 | Nolan ............ G06Q 30/04 |
| 2018/0018313 A1 | 1/2018 | Bishop et al. |
| 2018/0018322 A1 | 1/2018 | Mukherjee et al. |
| 2018/0032497 A1 | 2/2018 | Mukherjee et al. |
| 2018/0114060 A1 | 4/2018 | Lozano et al. |
| 2018/0144421 A1 | 5/2018 | Williams et al. |
| 2018/0225851 A1 | 8/2018 | Liu |
| 2018/0351999 A1* | 12/2018 | Barday ............ H04L 63/04 |
| 2019/0139147 A1 | 5/2019 | Mittal et al. |
| 2019/0370325 A1 | 12/2019 | Dasgupta et al. |
| 2019/0370601 A1 | 12/2019 | Anil Kumar et al. |
| 2020/0065383 A1 | 2/2020 | Hadi et al. |
| 2020/0089887 A1* | 3/2020 | Luthra ............ G06F 21/552 |
| 2020/0151430 A1 | 5/2020 | Hassan et al. |

(56) References Cited

U.S. PATENT DOCUMENTS

FOREIGN PATENT DOCUMENTS

| EM | 002075002-0002 | 7/2012 |
|---|---|---|
| JP | 2001-222611 A | 8/2001 |

OTHER PUBLICATIONS

Black Outline Shining Lamp Bulb, by dinosoftlabs, depositphotos.com [online], published on Jun. 12, 2018, [retrieved on Jul. 6, 2021], retrieved from the Internet <URL: https://depositphotos.com/199858624/stock-illustration-black-outline-shining-lamp-bulb.html> (Year: 2018).
Bright Glowing Yellow Idea Solution Light Bulb Held by Young Human, by harishmarnad, depositphotos.com [online], published on Apr. 6, 2015, [retrieved on Jul. 2, 2021], retrieved from the Internet <URL: https://depositphotos.com/69648877/stock-photo-bright-glowing-yellow-idea-solution.html> (Year: 2015).
Electric Lightbulb Icon Stock Illustration, by bubaone, istockphoto.com [online], published on Oct. 9, 2019, [retrieved on Nov. 10, 2020], retrieved from the Internet <URL: https://www.istockphoto.com/vector/electric-lightbulb-icon-gm1180049972-3-30442081> (Year: 2019).
Idea Solution Symbol Light Bulb Vector Stock, by Random Illustrator, shutterstock.com [online], available by Jan. 17, 2019 (as verified by TinEye), [retrieved on Jul. 6, 2021], retrieved from the Internet <URL: https://www.shutterstock.com/image-vector/idea-solution-symbol-light-bulb-vector-1198241170?> (Year: 2019).
Othercircles Icons, by Volkov, iconfinder.com [online], published on Aug. 21, 2013, [retrieved on Jul. 6, 2021], retrieved from the Internet <URL: https://www.iconfinder.com/iconsets/othercircles> (Year: 2013).
Trademark Registration Serial No. 78432715, Oct. 4, 2005 (publication date), (APPLICANT) Jumpstart Technologies, LLC, Limited Liability Company, California, Trademark Electronic Service System (TESS), available at www.uspto.gov (Year: 2005).
Trademark Registration Serial No. 87819315, Apr. 1, 2018 (first use date), (APPLICANT) The Schmitz Inc., CORPORATION, Florida, Trademark Electronic Service System (TESS), available at www.uspto.gov (Year: 2018).
Vector Business Idea Illustration, by aeaechan, depositphotos.com [online], published on Feb. 5, 2016, [retrieved on Jul. 2, 2021], retrieved from the Internet <URL: https://depositphotos.com/98385016/stock-illustration-vector-business-idea-illustration-hand.html> (Year: 2016).
Vector Pointing Finger Bulb Concept, by Juliasart, depositphotos.com [online], published on Jun. 1, 2018, [retrieved on Jul. 2, 2021], retrieved from the Internet <URL: https://depositphotos.com/198051026/stock-illustration-vector-illustration-flat-design-isolated.html> (Year: 2018).
Ambrogi, Robert, Wolters Kluwer Brings Machine Learning to Legal Invoice Analysis, LawSites blog, Mar. 29, 2017, found at https://www.lawsitesblog.com/2017/03/wolters-kluwer-brings-machine-learning-legal-invoice-analysis.html on Jan. 22, 2019.
Hernandez, Gabrielle Orum, Inside Wolters Kluwer's Take on Machine Learning in E-Billing, Law.com blog, Apr. 9, 2017, found at https://www.law.com/2017/04/09/inside-wolters-kluwers-take-on-machine-learning-in-e-billing/?slretum=20190022143039 on Jan. 22, 2019.
Legal Bill Review Reimagined, Wolters Kluwer website, found at https://www.wkelmsolutions.com/legalview-billanalyzer-savings-calculator on Jan. 22, 2019.
AI-powered IBM Outside Counsel Insights is here to help save insurance companies millions, IBM video and website bund at https://mediacenter.ibm.com/media/AIpowered+IBM+Outside+Counsel+Insights+is+here+to+help+sa%20ve+insurance+companies+millions/1_56hk70vq on Feb. 10, 2019.
"Identify a list of items using Natural Language Processing", StackOverflow, May 2017, web page found at https://stackoverflow.com/questions/44112675/identify-a-list-of-items-using-natural-language-processing on Nov. 27, 2018.
Marco Tulio Ribeiro, Sameer Singh, Carlos Guestrin, ""Why Should I Trust You?": Explaining the Predictions of Any Classifier", 2016, arXiv:1602.04938 [cs.LG].
Lime source code, downloaded from https://github.com/marcotcr/lime on Apr. 21, 2020.
Amrit, Chintan, et al., "Identifying child abuse through text mining and machine learning", Expert Systems With Applications 88(2017), pp. 402-418, available at https://www.sciencedirect.com/science/article/pii/S0957417304529.

* cited by examiner

| Date | TK | Item Type | Narrative | Units | Rate | Amount |
|---|---|---|---|---|---|---|
| 05/01/2016 | R.W | Fee | Prepare and serve interrogatories and sun Lorem ipsum dolor sit amet, consectetur adi- sicing elit, sed do eiusmod tempor incididunt ut labore et dolore magna aliqua. | 0.10 | 80.0000 | 1000.00 |
| 05/01/2016 | LP | Fee | Prepare and serve interrogatories and sun Lorem ipsum dolor sit amet, consectetur adi- sicing elit, sed do eiusmod tempor incididunt ut labore et dolore magna aliqua. | 0.80 | 80.0000 | 1000.00 |
| | | Dropdown Rate Deviation | Category Non-billable Over…Overtime charges | -0.10 | -175.0000 | -175.00 |
| 05/01/2016 | R.W | Fee | Prepare correspondence to adjuster, John Doe, regarding records review invoice from Dr. Smith, in furtherance of defense strategy. | 40.00 | 100.0000 | 1000.00 |
| 05/01/2016 | LP | Fee | Prepare and serve interrogatories and sun Lorem ipsum dolor sit amet, consectetur adi- sicing elit, sed do eiusmod tempor incididunt ut labore et dolore magna aliqua. | 40.00 | 140.0000 | 1000.00 |
| | | Dropdown Rate Deviation | Category Non-billable Over…Overtime charges | -0.10 | -175.0000 | -175.00 |
| 05/01/2016 | LP | Fee | Prepare and serve interrogatories and sun Lorem ipsum dolor sit amet, consectetur adi- sicing elit, sed do eiusmod tempor incididunt ut labore et dolore magna aliqua. | 10.00 | 140.0000 | 1000.00 |
| | | Dropdown Rate Deviation | Category Non-billable Over…Overtime charges | | | |
| 05/01/2016 | LP | Fee | Prepare and serve interrogatories and sun Lorem ipsum dolor sit amet, consectetur adi- sicing elit, sed do eiusmod tempor incididunt ut labore et dolore magna aliqua. | 10.00 | 200.0000 | 1000.00 |
| 05/01/2016 | LP | Fee | Prepare and serve interrogatories and sun Lorem ipsum dolor sit amet. Prepare and serve interrogatories and sun Lorem ipsum dolor sit amet. | 40.00 | 140.0000 | 1000.00 |
| | | Dropdown Rate Deviation | Category Non-billable Over…Overtime charges | -0.10 | -175.0000 | -175.00 |

*Figure 1*

| Item Type | Narrative | | Units | Rate | Amount |
|---|---|---|---|---|---|
| Fee | Prepare and server interrogatories and sun Lorem ipsum dolor sit amet, consectetur adi- sicing elit, sed do eiusmod tempor incididunt ut labore et dolore magna aliqua. | | 0.10 | 80.0000 | 1000.00 |
| Fee | Prepare and server interrogatories and sun Lorem ipsum dolor sit amet, consectetur adi- sicing elit, sed do eiusmod tempor incididunt ut labore et dolore magna aliqua. | | 0.80 | 80.0000 | 1000.00 |
| Dropdown Rate Deviation Category Non-billable Over.. Overtime charges | | | -0.10 | -175.0000 | -175.00 |
| Fee | Prepare correspondence to adjuster, John Doe, regarding records review invoice from Dr. Smith, in furtherance of defense strategy. | | 40.00 | 100.0000 | 1000.00 |
| Fee | Prepare and server interrogatories and sun Lorem ipsum dolor sit amet, consectetur adi- sicing elit, sed do eiusmod tempor incididunt ut labore et dolore magna aliqua. | | 40.00 | 140.0000 | 1000.00 |
| Dropdown Rate Deviation Category Non-billable Over.. Overtime charges | | | -0.10 | -175.0000 | -175.00 |
| Fee | Prepare and server interrogatories and sun Lorem ipsum dolor sit amet, consectetur adi- sicing elit, sed do eiusmod tempor incididunt ut labore et dolore magna aliqua. | | 10.00 | 140.0000 | 1000.00 |
| Dropdown Rate Deviation Category Non-billable Over.. Overtime charges | | | | | -175.00 |
| Dropdown Rate Deviation Category Non-billable Over.. Overtime charges | | | | | |
| Fee | Prepare and server interrogatories and sun Lorem ipsum dolor sit amet, consectetur adi- sicing elit, sed do eiusmod tempor incididunt ut labore et dolore magna aliqua. | | 10.00 | 200.0000 | 1000.00 |

*Figure 2*

| Item Type | Narrative | Units | Rate | Amount |
|---|---|---|---|---|
| Fee | Prepare and serve interrogatories and sun Lorem ipsum dolor sit amet, consectetur adi- sicing elit, sed do eiusmod tempor incididunt ut labore et dolore magna aliqua. | 0.10 | 80.0000 | 1000.00 |
| Fee | Prepare and serve interrogatories and sun Lorem ipsum dolor sit amet, consectetur adi- sicing elit, sed do eiusmod tempor incididunt ut labore et dolore magna aliqua. | 0.00 | 80.0000 | 1000.00 |
| Dropdown Rate Deviation  Category  Non-billable Over... Overtime charges | | -0.10 | -175.0000 | -175.00 |
| Fee | Prepare correspondence to adjuster, John Doe, regarding records review invoice from Dr. Smith, in furtherance of defense strategy. | 40.00 | 100.0000 | 1000.00 |
| Fee | Prepare and serve interrogatories and sun Lorem ipsum dolor sit amet, consectetur adi- sicing elit, sed do eiusmod tempor incididunt ut labore et dolore magna aliqua. | 40.00 | 140.0000 | 1000.00 |
| Dropdown Rate Deviation  Category  Non-billable Over... Overtime charges | | -0.10 | -175.0000 | -175.00 |
| Fee | Prepare and serve interrogatories and sun Lorem ipsum dolor sit amet, consectetur adi- sicing elit, sed do eiusmod tempor incididunt ut labore et dolore magna aliqua. | 10.00 | 140.0000 | 1000.00 |
| Dropdown Rate Deviation  Category  Non-billable Over... Overtime charges | | | | -175.00 |
| Dropdown Rate Deviation  Category  Non-billable Over... Overtime charges | | | | |
| Fee | Prepare and serve interrogatories and sun Lorem ipsum dolor sit amet, consectetur adi- sicing elit, sed do eiusmod tempor incididunt ut labore et dolore magna aliqua. | 10.00 | 200.0000 | 1000.00 |

*Figure 3*

CALIBRATION OF A MACHINE LEARNING CONFIDENCE SCORE

PRIOR APPLICATION

This application is a continuation of U.S. patent application Ser. No. 17/328,387, "Visualization of a Machine Learning Confidence Score", filed on May 24, 2121, said application incorporated herein by reference. U.S. patent application Ser. No. 17/328,387 is a continuation of U.S. patent application Ser. No. 16/919,580, "The Visualization of a Machine Learning Confidence Score and Rationale", filed on Jul. 2, 2020, now U.S. Pat. No. 11,029,814, issued on Jun. 8, 2021, said application incorporated herein by reference. U.S. patent application Ser. No. 16/919,580 is a continuation of U.S. patent application Ser. No. 16/299,227, "Machine Learning Visualization", filed on Mar. 12, 2019, said application incorporated herein by reference. This application is also related to two design patent applications, US Design patent application 29/678,877, "A Light Bulb Indicator of a Machine Learning Confidence Score", filed on Jan. 31, 2019, and US Design patent application 29/678,886, "A User Interface for Collecting Machine Learning Feedback", filed on Jan. 31, 2019. Both applications are hereby incorporated by reference.

BACKGROUND

Technical Field

The system, apparatuses and methods described herein generally relate to machine learning visualization, and, in particular, to visual techniques for displaying a machine learning confidence score and reasoning on a display screen.

Description of the Related Art

The name machine learning was coined in 1959 by Arthur Samuel. Tom M. Mitchell provided a widely quoted, more formal definition of the algorithms studied in the machine learning field: "A computer program is said to learn from experience E with respect to some class of tasks T and performance measure P if its performance at tasks in T, as measured by P, improves with experience E." This definition of the tasks in which machine learning is concerned offers a fundamentally operational definition rather than defining the field in cognitive terms.

Machine learning tasks are classified into several broad categories. In supervised learning, the algorithm builds a mathematical model of a set of data that contains both the inputs and the desired outputs. For example, if the task were determining whether an image contained a certain object, the training data for a supervised learning algorithm would include images with and without that object (the input), and each image would have a label (the output) designating whether it contained the object. In special cases, the input may be only partially available or restricted to special feedback. Semi-supervised learning algorithms develop mathematical models from incomplete training data, where a portion of the sample inputs are missing the desired output.

Machine learning implementations have two different modes, one for the operation of the algorithms and another for the learning aspect. In a supervised machine learning implementation, both the learning from training data and the actual supervised operation require that the data be specified as true or false as to the specific criteria. For instance, in the field of legal spend management, supervised machine learning is used to review legal invoices to see if the item billed fits within a set of billing criteria. If the invoice item fits within the criteria, the item is allowed. Otherwise, the invoice item is rejected. A machine learning algorithm will parse the invoice item and match certain words against a model developed by the machine learning engine. The invoice is then displayed to a user to validate the machine's determination.

While some machine learning, Amazon storefront, for example, incorporate feedback into its user interface by taking what you buy or search for and outputting similar products as suggestions, other machine learning tasks incorporate a simple agree/disagree user interface. But neither interface provides an explanation of why the machine made its determination. There is a strong need in the industry to improve the communications from the machine to the supervising user as to why a determination is made, and to provide an easy, intuitive means for the supervising user to provide feedback to the machine.

The present inventions address these issues.

BRIEF SUMMARY OF THE INVENTION

A special purpose computer implemented method of visualizing a machine learning confidence score is described herein. The method is made up of the steps of processing a textual description through a machine learning model to derive the machine learning confidence score. The machine learning model uses natural language processing to convert the textual description into word stems that are used by the machine learning model to calculate the machine learning confidence score. Once the confidence score is determined, the algorithm then searches the textual description for word stems that comprised the highest impact on the confidence score. Formatting instructions are added in the textual description to at least one word associated with the word stems that comprised the highest impact on the confidence score. The textual description with the formatting instructions to indicate reasoning used by the machine learning model in the determination of the machine learning confidence score is then displayed on a display screen, and input from a user correcting the machine learning confidence score is accepted, the input used to teach the machine learning model.

The method may use the textual description from a legal invoice, a medical invoice, or another document. A variable icon could be displayed on the display screen to graphically indicate the machine learning confidence score. The variable icon could display a different number of items depending upon the magnitude of the confidence score; in some embodiments, the variable icon displays three rays off of a lightbulb based on one range of the confidence score, and one ray off of the lightbulb based on another range of the confidence score. The variable icon could change once the input from the user is accepted. The user input could modify the machine learning model in real time.

An apparatus for the visualization of a machine learning confidence score is also described herein. The apparatus is made up of a display screen, a special purpose computer electrically connected to the display screen, and a large capacity data storage facility with a machine learning training data set. The apparatus further includes a user interface display module operating on the special purpose computer and displaying an indication of the confidence score on the display screen; a natural language processing module operating on the special purpose computer and interfacing with the user interface display module to convert a textual description into a table of word stems; a machine learning module operating on the special purpose computer and interfacing with the natural language processing module to convert the table of word stems into a confidence score using a machine learning model built using the machine learning training data set; a scan back module operating on the special purpose computer and interfacing to the machine learning module to insert formatting instructions into the textual description using the table of stems to format at least one word in the textual description that impacted the confidence score; and a user interface input module operating on the special purpose computer and interfacing with the scan back module to display the textual description with the formatting instructions and to accept user input regarding the confidence score and to add the user input to the machine learning training data set.

The apparatus may use the textual description from a legal invoice, a medical invoice, or another document. The indication of the confidence score on the display screen could be in the form of a variable icon that varies depending on the magnitude of the confidence score. The variable icon could display a different number of items depending upon the magnitude of the confidence score; in some embodiments, the variable icon displays three rays off of a lightbulb based on one range of the confidence score, and one ray off of the lightbulb based on another range of the confidence score. The user input could modify the machine learning model in real time.

A system for the visualization of a machine learning confidence score is also described herein. The system is made up of a display screen on a personal computing device and a special purpose computer electrically connected to the personal computing device through a network and to a large capacity data storage facility with a machine learning training data set. The system also includes a user interface display module operating on the personal computing device and displaying the confidence score on the display screen in the form of a variable icon that varies depending on the magnitude of the confidence score; and a natural language processing module operating on the special purpose computer to convert a textual description into a table of word stems. In addition, the system includes a machine learning module operating on the special purpose computer and interfacing with the natural language processing module to convert the table of word stems into a confidence score using a machine learning model built using the machine learning training data set; a scan back module operating on the special purpose computer and interfacing to the machine learning module to insert formatting instructions into the textual description using the confidence score and the table of stems to format at least one word in the textual description that impacted the confidence score; and a user interface input module operating on the personal computing device and interfacing with the scan back module through the network to display the textual description with the formatting instructions and to accept user input regarding the confidence score and sending the user input to the special purpose computer to add the user input to the machine learning training data set.

The system may use the textual description from a legal invoice or other documents. The variable icon could display a different number of items depending upon the magnitude of the confidence score; in some embodiments, the variable icon displays three rays off of a lightbulb based on one range of the confidence score, and one ray off of the lightbulb based on another range of the confidence score. The variable icon could change once the input from the user is accepted. The user input could modify the machine learning model in real time.

A special purpose computer implemented method of visualizing a machine learning confidence score is recited herein. The method comprises (1) determining the machine learning confidence score on an invoice, (2) displaying an indication of the machine learning confidence score on a display screen along with the narrative section, (3) detecting a user input, (4) changing the indication of the machine learning confidence score based on the user input; and (5) displaying the word cloud. The (1) determining if the machine learning confidence score comprises (1a) parsing a narrative section of the invoice into a table of words, (1b) converting the words in the table into stems, (1c) looking up each stem in a machine learning model, (1d) placing a weight for the stem, as found in the machine learning model, in the table of the words, (1e) determining a confidence score by averaging the weights for each word in the table of the words; and looking through the narrative section and changing the formatting of the words based on a relative weight in the table of the words to create a word cloud.

The formatting could be a bold format, color format, and/or font size. The user input could be a mouse-over and/or a touch on a touch screen. The changing of the indication of the confidence score could display a thumb icon (the thumb icon could be a thumb up icon). The method could further include (6) accepting a user indication of the acceptance of the confidence score, and possibly (7) changing the display screen to reflect that the confidence score has been accepted.

An apparatus for visualization of a machine learning confidence score is also described herein. The apparatus comprises a display screen; a special purpose computer electrically connected to the display screen; a large capacity data storage facility with a machine learning training data set; a user interface display algorithm operates on the special purpose computer and displays an indication of the machine learning confidence score on the display screen; a natural language processing algorithm operates on the special purpose computer and interfaces with the user interface display algorithm to convert a textual description into a table of word stems; a machine learning algorithm operates on the special purpose computer and interfaces with the natural language processing algorithm to convert the table of the word stems into the machine learning confidence score using a machine learning model built using the machine learning training data set; a scan back algorithm operates on the special purpose computer and interfaces to the machine learning algorithm to insert format instructions into the textual description using the table of word stems to format at least one word in the textual description that impacted the machine learning confidence score; and a user interface input algorithm operates on the special purpose computer and interfaces with the scan back algorithm to display the textual description with the format instructions and to accept user input regarding the machine learning confidence score and to add the user input to the machine learning training data set, wherein the textual description with the format instructions is only displayed on the display screen when a mouse location is over a variable icon that varies depending on a magnitude of the machine learning confidence score.

A special purpose computer implemented method of visualizing a machine learning confidence score is also described here. The method comprises (1) displaying an indication of the machine learning confidence score on a display screen along with a narrative section, (2) detecting that a mouse location is over the indication of the machine learning confidence score on the display screen, (3) changing the indication of the machine learning confidence score based on the mouse over the indication of the machine learning confidence score, and (4) changing the formatting of the narrative section based on the mouse over the indication of the machine learning confidence score.

The indication of the machine learning confidence score could be a light bulb icon. The light bulb icon could vary the number of rays with the light bulb icon based on the machine learning confidence score.

An apparatus for visualization of a machine learning confidence score is also described here. The apparatus comprises a display screen, a special purpose computer electrically connected to the display screen, a large capacity data storage facility with a machine learning training data set, a machine learning model built with the machine learning training data set, a machine learning algorithm programmed to operate on the special purpose computer and to interface with the machine learning model to convert a textual entry into the machine learning confidence score, and a user interface display algorithm programmed to operate on the special purpose computer and display an indication of the machine learning confidence score on the display screen. The indication is a variable icon that varies a count of icon elements on the variable icon depending on a magnitude of the machine learning confidence score.

The variable icon could be a lightbulb icon, and the icon elements could be rays. The user interface display algorithm could be programmed to display three rays off of the lightbulb icon based on one range of the machine learning confidence score, and one ray off of the lightbulb icon based on a second range of the machine learning confidence score.

The count of the icon elements could be at least three. The textual entry could be a portion of an invoice. The apparatus could also include a natural language processing algorithm programmed to operate on the special purpose computer and to interface with the user interface display algorithm to convert the textual entry into a table of word stems; and the machine learning algorithm could be programmed to operate on the special purpose computer and to interfaces with the natural language processing algorithm to convert the table of the word stems into the machine learning confidence score using the machine learning model.

A special purpose computer implemented method of visualizing a machine learning confidence score is also described here. The method comprises the steps of (1) building a machine learning model with a machine learning training data set, (2) operating a machine learning algorithm using the machine learning model to convert a textual entry into the machine learning confidence score, (3) displaying an indication of the machine learning confidence score on a display screen, wherein the indication is a variable icon, and (4) varying a count of icon elements on the variable icon depending on a magnitude of the machine learning confidence score.

This document also describes non-transitory machine-readable media programmed to build a machine learning model with a machine learning training data set, operate a machine learning algorithm using the machine learning model to convert a textual entry into a machine learning confidence score, display an indication of the machine learning confidence score on a display screen, wherein the indication is a variable icon, and vary a count of icon elements on the variable icon depending on a magnitude of the machine learning confidence score.

BRIEF DESCRIPTION OF THE DRAWINGS

FIG. 1 is a screen shot of a legal invoice with the confidence score indication.

FIG. 2 is a screen shot of a legal invoice with a mouse hovering over the confidence score indication.

FIG. 3 is a screen shot of a legal invoice with a mouse hovering over the confidence score after the user has approved the machine score.

DETAILED DESCRIPTION

Figure 4:
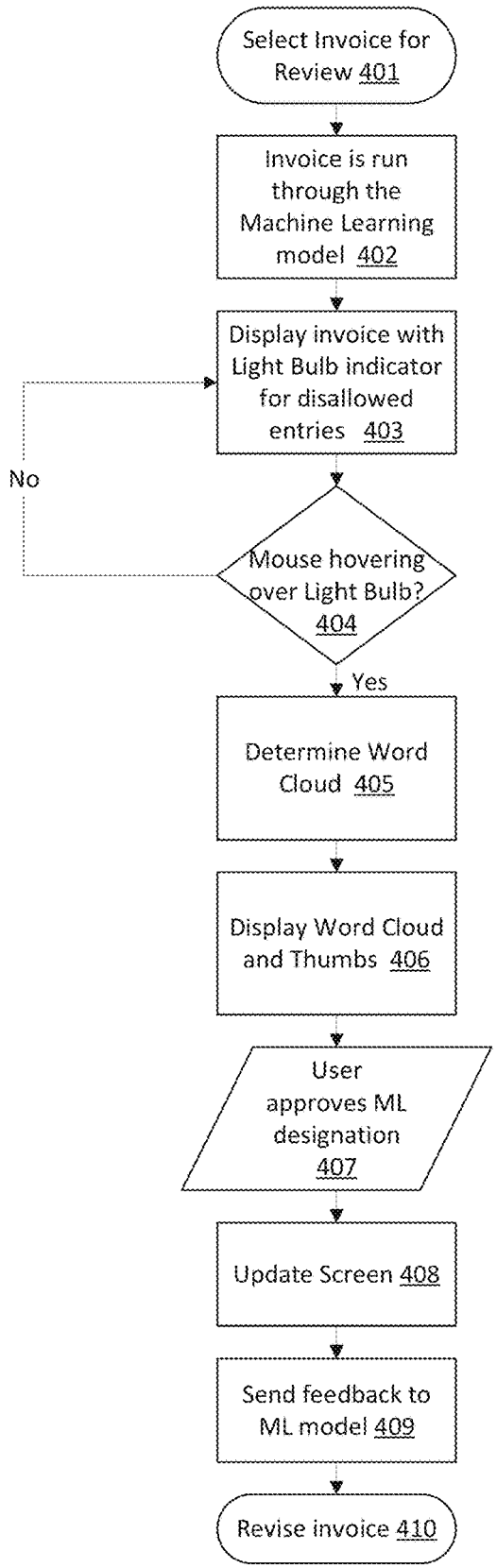
FIG. 4 illustrates a flow chart of the user interface code in one embodiment.

There is a strong need in the machine learning industry to provide meaningful information to the supervising user in a way that is intuitive and easy to use. Since the teaching of the machine may include thousands of evaluations from users who have little extra time to train machine models, the ease of rapidly understanding the machine's rationale and inputting feedback is critical.

In the field of legal spend management, auditors are hired to review every legal bill sent to an insurance company or other entity to assure that the billing adheres to contractual billing guidelines. This task of reviewing invoices requires trained auditors, often lawyers themselves, performing the tedious task of reading each line of each legal bill for compliance. The reviewers vary in their interpretation due to the personalities of each auditor. In addition, the labor costs of reviewing legal bills are high.

As a result, the legal spend management industry has started to use rule based heuristics and machine learning analysis of legal invoices to lower costs and provide a consistent interpretation. While machine learning provides an improvement over human review and heuristic determinations, in the analysis of the highly variable text in the invoices, supervised machine learning is far from easy to use.

The present inventions provide a user interface that simply presents the machine's determination, both in terms of acceptance or rejection of an invoice item, but also provides an indication of the machine's confidence in the determination.

While the example below uses legal invoices, the present inventions could be applied to medical bills, fleet maintenance bills, or any other type of invoices. Furthermore, any time of supervised machine learning could benefit from the user interface and algorithms described herein. The narrative description 102 could explain the tasks of a lawyer, a court reporter, an independent adjustor, an accountant, an engineer, an expert witness, or any number of other workers.

Looking at FIG. 1, we see a portion of a legal invoice that has been processed by a machine learning model. This portion of the invoice is a table of seven rows, where each row is an individual timecard entry. Each entry has a date 101, a narrative 102, an amount 104, and other columns. There are a number of types of analysis that can be performed that are not described herein, for instance assuring that the dates 101 are within a range or that the calculations of the amount 104 are correct.

For purposes of our description in this embodiment, we focus on the narrative 102, but the other columns, or other information on the invoice or even beyond the invoice, may be used without detracting from the inventions herein. The narrative 102 is analyzed to determine if it fits within a criterion. In the first row, the machine believes that the timecard entry in this row should be rejected, but the machine has a low confidence in its determination. This is seen because the light bulb indicator 103 has only one ray lit, indicating a low confidence. The machine's confidence score for this row is determined by the model, as described below. The machine, in its creation of the user interface, has the confidence score within a certain range that indicates a lower confidence level.

The second row has no light bulb indicator, indicating that the machine believes that this time card entry is allowable. Technically, this means that the machine learning confidence score is below a threshold. The third row has a light bulb indicator 105 with all rays lit, indicating high confidence that this time card entry should be rejected. The sixth row has a light bulb indicator 107 with two rays lit, indicating medium confidence in the scoring. In one embodiment, the confidence score could have a range from 0 to 100. All confidence scores less than 40 could be determined to be billable, scores from 41-60 could display one ray 103, all confidence scores from 61-80 could display two rays 107, and all scores above 81 could display three rays 105. (The number of rays could be changed without detracting from the inventions herein).

In the fourth row, a partially disallowed timecard entry is shown, with $175.00 deducted from this line item 106.

FIG. 2 shows the display screen when the mouse hovers over the light bulb icon 205. The mouse over indicates that the user, who is teaching the machine, is focusing on the particular line of the invoice. Other embodiments could include tracking the user's eyes to determine focus or watching where a finger is hovering on a touch screen. In still another embodiment, every line of the invoice displays as in the third section of FIG. 2.

In this example, the mouse hovers over the light bulb icon 205 and the user interface software detects the mouse over. The software then presents the user with three options to select: a thumbs up icon 202, or a thumbs down icon 203, or a comment icon 204.

If the user selects the thumbs up icon 202, the user is approving of the machine learning decision. The time card entry in the legal invoice for that line is marked as disallowed, and the machine learning algorithm is affirmed. The thumbs up icon 202 may be filled in (or a symbol (dot, for example) inserted into it) to provide feedback to the user that his input has been received. In some embodiments, a separate user interface is provided to allow the user to allow a portion of this time card entry.

If the user selects the thumbs down icon 203, the user is disapproving of the machine learning decision. The time card entry in the legal invoice for that line is marked as allowed, and the machine learning algorithm is notified that the answer is incorrect. The machine learning algorithm can adjust on the fly, or the correction can be batched up for the next run of the model. The thumbs down icon 203 may be filled in (or a symbol (dot, for example) inserted into it) to provide feedback to the user that his input has been received. This is shown in FIG. 3 as item 302.

If the user selects the comment icon 204, the user is allowed to enter comments on the invoice line. The comment icon 204 is filled in (or has a symbol (dot, for example) inserted into it) to indicate that there is a comment on this item. A second frame or window is presented to the user to collect the comment.

Once the user has made a selection, a dot is placed in the middle of the light bulb icon 202, as seen in item 304 of FIG. 3. Each time the mouse hovers over the light bulb icon 304 after the user has made a selection, the thumbs up icon 202, thumbs down icon 203, or comment icon 204 will indicate the previous selection by filling in the selected choice (the thumbs down icon 302, for example).

The user has the option, once a selection is made, to select the icon 202, 203, 204 again to remove the selection. In this case, the dot in the lightbulb is removed, in one embodiment. The user may also select the other thumb icon 202, 203 to change the selection.

During the mouse over, the reasoning for the machine learning confidence score is indicated in the narrative 201 column for that line of the invoice 206 by changing the formatting of the words in the narrative. In the present embodiment, the words that drove the confidence score are bolded 207, 208 and the words that are the most important drivers of the confidence score increase their font sizes 207. This allows the user to easily see the machine's reasoning behind the confidence score. This is similar to a teacher requiring a student to show their work as to why they made the choice that they made.

In an alternative embodiment, the words that drive the confidence score could be displayed in a different color, italicized, single and double underlined, or any other user interface indication.

In FIG. 3, we see the display screen with the user deciding to disapprove of the machine's determination of line three of the invoice. The thumbs down icon 302 is filled in and a dot is placed in the middle of the light bulb icon 304 to indicate that the user has made a selection for this item. While the thumb icons 301, 302 and the comment icon 303 will disappear when the mouse is no longer hovering over the light bulb icon 304, the light bulb icon 304 will continue to display the dot in the middle to indicate that the user has graded the machine's determination of this line of the invoice. In other embodiments, the dot in the light bulb icon 304 could be replaced with another type of indication, such as icon color or other visual change in the icon 304.

As in FIG. 2, the narrative line 306 includes a word cloud type indication of the words that drove the machine learning confidence score. In addition, the user may note 305 a partial or full dismissal of the invoice amount for that line item as well as a categorization of the reason for cutting the bill.

FIG. 4 shows one possible user interface algorithm for implementing the above described user interface. The algorithm begins when the user (or an automaton) selects an invoice to review 401. The invoice is then processed by the machine learning model 402. Each line of the invoice is analyzed to determine a machine learning confidence score for the line. Based on the confidence score, different icons are displayed on the screen to provide the user with information on the machine's determination 403. In one embodiment, the confidence score could have a range from 0 to 100. All confidence scores less than 40 could be determined to be billable, with no icon displayed, scores from 41-60 could display one ray 103, all confidence scores from 61-80 could display two rays 107, and all scores above 81 could display three rays 105. (The number of rays and categories could be changed without detracting from the inventions herein).

The mouse location is then checked by the user interface 404, and if the mouse is over a light bulb icon 103, 105, 107, then the line is processed to indicate details of the reasoning.

The word cloud of the narrative text is determined 405 (see FIG. 5) and displayed 406, replacing the text of the narrative with the narrative text with formatting indicating the reasoning for the machine learning score. The thumbs up icon 202, thumbs down icon 203, and comment icon 204 are also displayed where the mouse is located.

If the mouse moves to another area of the screen, the formatting of the text narrative and thumbs icons 202, 203, 204 will be removed from the screen.

If the user selects one of the thumbs icons 202, 203, 204, the screen will be updated 408 to reflect the choice 407. The selected icon will be filled in (thumbs down icon 302, for example) and a dot will be placed in the light bulb icon 304. The user's teaching indication will then be sent back to the machine learning model 409. The invoice is then revised if both the machine and the user agree that the billing entry needs to be rejected 410.

In some embodiments, when the invoice is run through the machine learning model 402, a data structure is returned for each line in the invoice with the narrative formatted to indicate the importance of each word in the narrative to the determination of the confidence score. In this scenario, the functionality of 405 is incorporated in 402, and block 406 simply replaces the original narrative with the stored narrative for that time card entry description.

Figure 5:
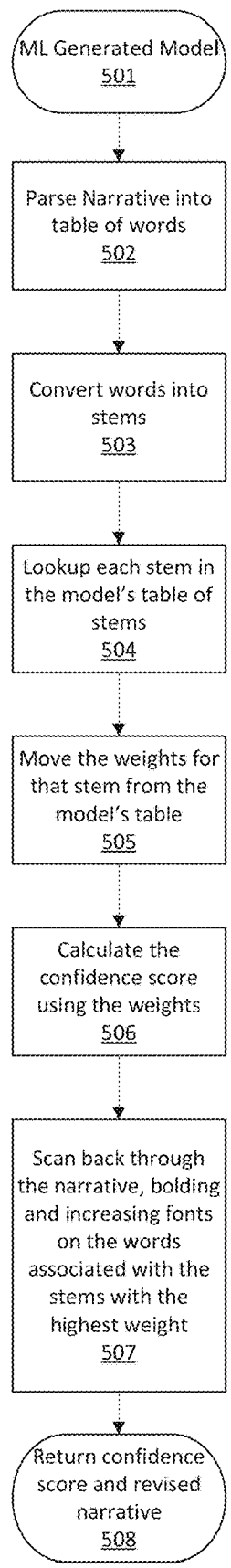
FIG. 5 is a flow chart of machine learning model execution.

FIG. 5 describes one embodiment of the operation of the machine learning model for a line of the invoice 501. First, the test of the narrative is parsed into a table of words 502. This could use traditional parsing techniques of searching for delimiters such as spaces, periods, tabs, commas, and other punctuation types. The strings between the delimiters are stored in a table. In some descriptions, this is called tokenization The words in the table are next analyzed to convert the word into its stem by removing parts of speech that are attached to the word, such as plurality 503. Some descriptions call finding this process lemmatization—figuring out the most basic form or lemma of each word in the sentence. For some models, the word is categorized as a noun, verb, adverb, adjective, etc. Steps 502, 503, 504 are often referred to as natural language processing.

Next, each word stem is looked up in the model's database of stems 505, and the corresponding weight of the word in the database is copied into the narrative's table of words. In a simple model, the weights are averaged to create a confidence score 506. More complicated models could use other statistical methods to determine the confidence score. For instance, verbs could be given more weight than adverbs, or a mean could be used rather than an average.

Once the confidence score has been determined, the algorithm model backtracks to format the narrative text according to the impact each word has on the confidence score 507. This is done by looking at the table to see the relative weight of each word. The highest weighted words are identified, and the original text of the narrative is searched for each of these highest weighted words. When the word is found, it is converted to bold format, and the font is increased by a factor.

The confidence score and the formatted narrative string are then returned 508.

Figure 6:
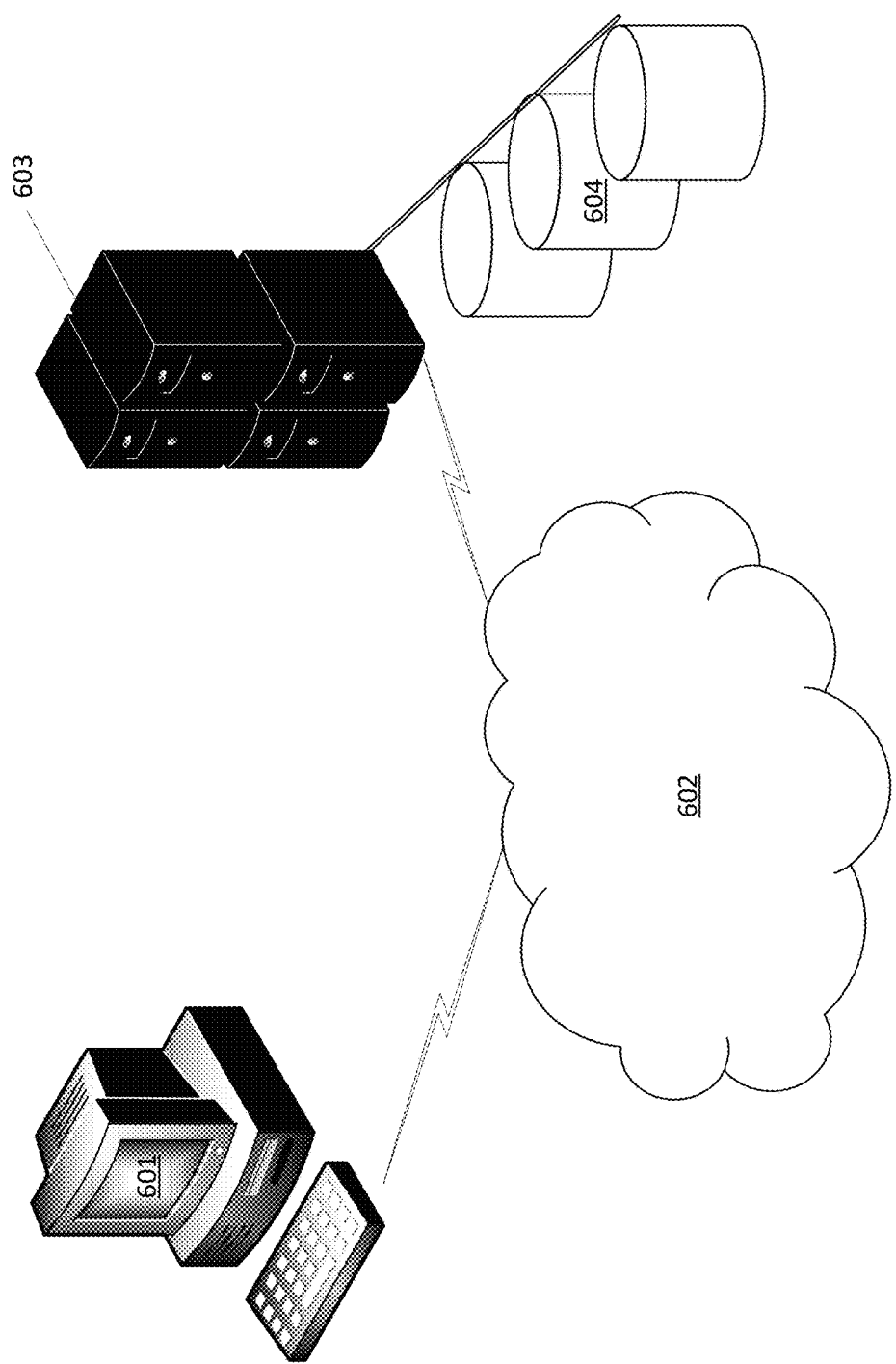
FIG. 6 is an electrical architecture of one embodiment.

Because of the complexities of machine learning algorithms, special purpose computing may be needed to build and execute the machine learning model described herein. FIG. 6 shows one such embodiment. The user views the user interface described here on a personal computing device such as a personal computer, laptop, tablet, smartphone, monitor, or similar device 601. The personal computing device 601 communicates through a network 602 such as the Internet, a local area network, or perhaps through a direct interface to the server 603. The server 603 is a high performance, multi-core computing device with significant storage facilities 604 in order to store the training data for the model. Since this training data is continuously updated through the present inventions, this data must be kept online and accessible so that it can be updated. In addition, the real-time editing of the model as the user provides feedback to the machine learning model 409 requires significant processing power to rebuild the model as feedback is received.

The server 603 is a high performance computing machine electrically connected to the network 602 and to the storage facilities 604.

While the above described embodiment involves machine learning confidence scores, the algorithm could be used with confidence scores using other software techniques. For instance, it is envisioned that a heuristically based algorithm could also be used to analyze the narrative field, and that the word cloud could be formed by inserting formatting into the narrative field at each step in the heuristical algorithm.

The foregoing devices and operations, including their implementation, will be familiar to, and understood by, those having ordinary skill in the art. This algorithm is necessarily rooted in computer technology in order to overcome the problem of displaying machine learning reasoning with a simple interface in order to receive user feedback in the machine's determination of a confidence score.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

What is claimed is:

1. A method of calibrating a machine learning confidence score, the method comprising:
processing a textual description through a machine learning model to derive the machine learning confidence score, wherein the machine learning model converts the textual description into word stems that are used by the machine learning model to calculate the machine learning confidence score, and then searches the textual description for the word stems that comprised a highest impact in the machine learning confidence score, adding formatting instructions to at least one word associated with the word stems that comprised the highest impact on the machine learning confidence score;
displaying on a display screen, when a mouse location is over a third icon, the textual description with the formatting instructions to indicate reasoning used by the machine learning model in a determination of the machine learning confidence score;
displaying a variable icon on the display screen to graphically indicate the machine learning confidence score, wherein the variable icon displays a different number of items depending upon a magnitude of the machine learning confidence score;
accepting from a user selection of a first icon approving or of a second icon disapproving the machine learning confidence score, said user selection used to teach the machine learning model;
adding the user selection to a machine learning data set; and training the machine learning model with the machine learning data set.

2. The method of claim 1 wherein the textual description is from a legal invoice.

3. The method of claim 1 wherein the textual description is from an expert witness invoice.

4. The method of claim 1 wherein a bold instruction is one of the formatting instructions.

5. The method of claim 1 wherein an instruction to increase font size is one of the formatting instructions.

6. The method of claim 1 wherein the variable icon displays three rays off of a lightbulb based on one range of the machine learning confidence score, and one ray off of the lightbulb based on another range of the machine learning confidence score.

7. The method of claim 1 wherein the user selection modifies the machine learning model in real time.

8. An apparatus for calibration of a machine learning confidence score, the apparatus comprising:
- a display screen;
- a computer electrically connected to the display screen;
- a large capacity data storage facility with a machine learning training data set;
- a user interface display module operating on the computer and displaying an indication of the machine learning confidence score on the display screen, wherein the indication of the machine learning confidence score on the display screen is in a form of a variable icon that graphically displays a different number of items depending on a magnitude of the machine learning confidence score;
- a natural language processing module operating on the computer and interfacing with the user interface display module to convert a textual description into a table of word stems;
- a machine learning module operating on the computer and interfacing with the natural language processing module to convert the table of the word stems into the machine learning confidence score using a machine learning model built using the machine learning training data set;
- a scan back module operating on the computer and interfacing to the machine learning module to insert formatting instructions into the textual description using the table of word stems to format at least one word in the textual description that impacted the machine learning confidence score; and
- a user interface input module operating on the computer and interfacing with the scan back module to display the textual description with the formatting instructions when a mouse location is over a third icon, and to accept a user selection of a first icon approving or of a second icon disapproving the machine learning confidence score and to add the user selection to the machine learning training data set.

9. The apparatus of claim 8 wherein the textual description is from an independent adjustor invoice.

10. The apparatus of claim 8 wherein a bold instruction is one of the formatting instructions.

11. The apparatus of claim 8 wherein an instruction to increase font size is one of the formatting instructions.

12. The apparatus of claim 8 wherein the variable icon displays three rays off of a lightbulb based on one range of the machine learning confidence score, and one ray off of the lightbulb based on another range of the machine learning confidence score.

13. The apparatus of claim 8 wherein the user selection modifies the machine learning model in real time.

14. A system for a visualization of a machine learning confidence score, the system comprising:
- a display screen on a personal computing device;
- a computer electrically connected to the personal computing device through a network;
- a large capacity data storage facility electrically connected to the computer, the large capacity data storage facility containing a machine learning training data set;
- a user interface display module operating on the computer and displaying an indication of the machine learning confidence score on the display screen, wherein the indication of the machine learning confidence score on the display screen is in a form of a variable icon that graphically displays a different number of items depending on a magnitude of the machine learning confidence score;
- a natural language processing module operating on the computer to convert a textual description into a table of word stems;
- a machine learning module operating on the computer and interfacing with the natural language processing module to convert the table of the word stems into the machine learning confidence score using a machine learning model built using the machine learning training data set;
- a scan back module operating on the computer and interfacing to the machine learning module to insert formatting instructions into the textual description using the machine learning confidence score and the table of word stems to format at least one word in the textual description that impacted the machine learning confidence score; and
- a user interface input module operating on the personal computing device and interfacing with the scan back module through the network to display the textual description with the formatting instructions, when a mouse location is over a third icon, and to accept a user selection of a first icon approving or of a second icon disapproving the machine learning confidence score and sending the user selection to the computer to add the user selection to the machine learning training data set.

15. The system of claim 14 wherein a bold instruction is one of the formatting instructions.

16. The system of claim 14 wherein an instruction to increase font size is one of the formatting instructions.

17. The system of claim 14 wherein the variable icon displays three rays off of a lightbulb based on one range of the machine learning confidence score, and one ray off of the lightbulb based on another range of the machine learning confidence score.

* * * * *